United States Patent
Patil et al.

(10) Patent No.: US 10,216,939 B2
(45) Date of Patent: Feb. 26, 2019

(54) IMPLEMENTING A SECURITY SOLUTION USING A LAYERING SYSTEM

(71) Applicant: Wyse Technology L.L.C., Santa Clara, CA (US)

(72) Inventors: Rushikesh Patil, Sunnyvale, CA (US); Puneet Kaushik, Fremont, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 166 days.

(21) Appl. No.: 15/142,035

(22) Filed: Apr. 29, 2016

(65) Prior Publication Data

US 2017/0316210 A1    Nov. 2, 2017

(51) Int. Cl.
 *G06F 21/56* (2013.01)
 *G06F 21/57* (2013.01)
 *G06F 21/55* (2013.01)

(52) U.S. Cl.
 CPC ............ *G06F 21/577* (2013.01); *G06F 21/55* (2013.01); *G06F 21/56* (2013.01)

(58) Field of Classification Search
 CPC .......... G06F 21/00; G06F 21/50; G06F 21/53; G06F 21/55; G06F 21/554; G06F 21/57; G06F 21/60; G06F 21/62; G06F 21/6218; G06F 21/6227; G06F 21/6281; G06F 21/78; G06F 21/56; G06F 21/561; G06F 21/566; G06F 21/568
 See application file for complete search history.

(56) References Cited

U.S. PATENT DOCUMENTS

| | | | | |
|---|---|---|---|---|
| 5,740,370 A * | 4/1998 | Battersby | .......... | G06F 17/30132 707/999.01 |
| 6,986,039 B1 * | 1/2006 | Leah | ....................... | G06F 21/31 380/274 |
| 7,165,260 B2 * | 1/2007 | Blaser | ....................... | G06F 8/61 717/174 |
| 7,395,324 B1 * | 7/2008 | Murphy | ............ | G06F 17/30067 707/E17.01 |
| 7,590,813 B1 * | 9/2009 | Szor | .................... | G06F 12/0804 711/163 |
| 7,877,511 B1 * | 1/2011 | Berger | ............... | G06F 17/30067 709/201 |
| 8,224,789 B1 * | 7/2012 | Caklovic | .............. | G06F 11/1469 707/674 |
| 8,245,035 B2 * | 8/2012 | Khalidi | ............... | G06F 9/44505 707/736 |
| 9,330,260 B1 * | 5/2016 | Guo | ....................... | G06F 21/566 |
| 2002/0078335 A1 * | 6/2002 | Cabrera | ................ | G06F 3/0607 713/1 |
| 2003/0233489 A1 * | 12/2003 | Blaser | ....................... | G06F 8/61 719/328 |
| 2004/0225690 A1 * | 11/2004 | Arkeketa | ............... | G06F 21/604 |
| 2005/0027746 A1 * | 2/2005 | Lin | .................... | G06F 17/30115 |

(Continued)

*Primary Examiner* — Eric W Shepperd
(74) *Attorney, Agent, or Firm* — Kirton McConkie; Brian Tucker

(57) ABSTRACT

A security solution can be implemented using a layering system. By using a layering system, any changes that are made to a computing system can be isolated within a separate write layer. Due to this isolation, the changes, which may even be malicious, can be evaluated without fear that the resources in other layers will be negatively affected. In this way, even security threats that are still unknown to antivirus solutions (so-called zero-day attacks) can be prevented from harming the system.

20 Claims, 14 Drawing Sheets

(56) References Cited

U.S. PATENT DOCUMENTS

| | | | |
|---|---|---|---|
| 2005/0273858 A1* | 12/2005 | Zadok | G06F 21/50 726/24 |
| 2008/0005133 A1* | 1/2008 | Khalidi | G06F 17/30235 |
| 2008/0109394 A1* | 5/2008 | Havens | G06F 17/30365 |
| 2008/0120439 A1* | 5/2008 | Kwan | G06F 9/44505 710/13 |
| 2009/0030935 A1* | 1/2009 | Kurichiyath | G06F 17/30129 |
| 2009/0182833 A1* | 7/2009 | Balasubramanian | G06Q 10/107 709/208 |
| 2010/0107113 A1* | 4/2010 | Innes | G06F 9/44505 715/779 |
| 2010/0229169 A1* | 9/2010 | Bunnell | G06F 9/455 718/1 |
| 2011/0055299 A1* | 3/2011 | Phillips | G06F 9/45533 707/827 |
| 2012/0036497 A1* | 2/2012 | Karthik | G06F 8/71 717/122 |
| 2012/0060004 A1* | 3/2012 | Rope | G06F 3/0623 711/154 |
| 2012/0304168 A1* | 11/2012 | Raj Seeniraj | G06F 8/38 718/1 |
| 2013/0111561 A1* | 5/2013 | Kaushik | H04L 63/105 726/4 |
| 2013/0318318 A1* | 11/2013 | Nemoto | G06F 11/1451 711/162 |
| 2014/0006858 A1* | 1/2014 | Helfman | G06F 11/1448 714/19 |
| 2014/0082235 A1* | 3/2014 | Kaushik | G06F 13/102 710/62 |
| 2015/0089497 A1* | 3/2015 | Borzycki | G06F 9/45533 718/1 |
| 2015/0199375 A1* | 7/2015 | Prahlad | G06F 17/30212 707/610 |
| 2015/0227384 A1* | 8/2015 | Zamir | G06F 8/65 718/1 |
| 2017/0264684 A1* | 9/2017 | Spillane | H04L 67/1095 |

* cited by examiner

IMPLEMENTING A SECURITY SOLUTION USING A LAYERING SYSTEM

CROSS-REFERENCE TO RELATED APPLICATIONS

N/A

BACKGROUND

The present invention is generally directed to implementing a security solution using a layering system. A layering system is a tool that enables an operating system, user applications, and user data to be layered on the user's computing device. When using a layering system, layered applications and data are executed natively on the user's computing device without the use of a virtual machine or other sandboxed execution environment. This native execution will therefore cause the layered applications to appear, both to the user and to other applications, as if they were being executed in a "normal" manner. This is in contrast to many types of virtualization techniques such as terminal services and application virtualization where it is typically clear that the applications are executed in a separate environment.

U.S. patent application Ser. Nos. 14/719,248 and 14/719,256 are both directed to a layering system and provide a background for the present invention. The content of these applications is therefore incorporated by reference. It is noted that both of these applications are commonly owned and would not constitute prior art to the present invention. Therefore, this background should not be construed as admitting prior art, but should be construed as describing various features on which the present invention is based and that may even form part of the present invention.

As is described in the '248 and '256 applications, a layer is a collection of data or resources which enables the collection to be isolated or set apart from the data or resources in another layer. To summarize this layering, FIG. 1 provides simplified examples of a user data layer 101 and an application layer 102. It is noted that a layer containing an operating system may also exist. Each layer can be stored in a manner that allows the layer to be separately mounted for access. For example, each layer may comprise a separate partition of a disk (including of a virtual disk). The ability to separately mount a layer allows the layering system to selectively provide access to particular layers. It will be assumed that the layering system determines that user data layer 101 and application layer 102 should be mounted in response to the user logging in to a computing device on which the layering system executes or which the layering system otherwise controls.

As shown in FIG. 1 and for simplicity, application layer 102 includes a single application, WINWORD.EXE, which is the executable for Microsoft Word. Word also requires a number of registry settings to execute properly, and therefore, application layer 102 also includes such registry settings. It is noted that these registry settings, which would normally be stored within the registry of the operating system, could be stored within application layer 102 in a registry hive. Of course, a typical installation of Word would require a number of other files and/or settings which are not depicted. Application layer 102 also includes layer metadata which describes the content of application layer 102 (e.g., which describes that the layer includes WINWORD.EXE and whatever structure is used to store the Word registry settings). This layer metadata is critical because it allows the layering system to quickly determine what exists on the layer.

User data layer 101 is structured in a similar way. However, as a user data layer, it stores the user's files which in this case constitute two Word documents: Report.docx and Summary.docx. As with application layer 102, user data layer 101 may also store a number of other files including configuration files that may be particular to this user (e.g., a template file for Word). User data layer 101 also includes layer metadata which defines the content of the layer. Again, this layer metadata is critical because it allows the layering system to quickly determine what exists on the layer.

As mentioned above, a layer can be a separately mountable portion of a storage device (whether physical or virtual) such as a partition. Accordingly, when the user logs on to a computing device, the layering system can mount layers 101 and 102 so that the user will have access to MS Word and his documents which are included in these layers. However, if a different user were to log in to the same computing device, the layering system could instead mount an application layer and user data layer pertaining to the different user so that the different user can only access the applications and user data defined in those layers.

The process by which the user accesses the data and resources included on each layer is provided in the '248 and '256 applications and will not be described in detail in this specification. By way of an overview, the layering system includes a file system filter driver and a registry filter driver which can function to intercept and redirect file system and registry operations as appropriate. In particular, these filters can be registered with the OS so that they will receive all file system and registry operations respectively. If a file system or registry operation pertains to content of a layer rather than to content of the file system or registry directly provided by the OS, the filters can redirect the operation to the corresponding layer. The '248 and '256 applications provide a number of examples of this type of redirection.

The result of this redirection is that, from the user perspective, the files of the layers do not appear to be stored in a different manner than any other file would typically be stored by the OS. For example, if the user data layer 101 were assigned a partition of E:, the layering system could cause the files to appear as if they were stored in the typical C: partition. In other words, the fact that multiple partitions may be loaded is abstracted (and even hidden) from the user perspective. It is again reiterated that the use of layer metadata to define what is stored on each layer allows this process to be carried out efficiently as is described in the '248 and '256 applications.

FIGS. 2A and 2B each illustrate an example of how the layering system can function. Each of these examples involve the layering file system filter driver (or LFFD) 201 and its role in determining whether to redirect a file open request. It is noted that a similar process would be carried out by the layering registry filter driver (or LRFD) if the operation pertained to the registry.

As shown in FIGS. 2A and 2B, it will be assumed that the operating system provides a file system 200 for handling I/O to the various mounted partitions. It will also be assumed that the operating system has mounted a C: partition and that the layering system has mounted an E: partition that corresponds to user data layer 101. In the following description, the E: partition and user data layer 101 (or simply layer) will be used interchangeably). However, it is noted that a partition is not the only structure that can be employed for a layer. It is also important to note that because the E: partition was mounted by the layering system, it will not appear in the same manner as the C: partition. In particular, the user will not be able to see the separate E: partition. Instead, the layering system may cause the contents of the E: partition to appear as if they were stored on the C: partition.

Accordingly, if the user selects to open the Report.docx file that is stored on the E: partition, a file open request 210 of C:\Docs\Report.docx may be generated. As is described in the '248 and '256 applications, LFFD 201 is registered as a filter driver for file system 200 and therefore will receive the opportunity to evaluate file open request 210. LFFD 201 can evaluate the target of file open request 210 against the layer metadata of the E: partition (and possibly against layer metadata of any other mounted layer) to determine if the request pertains to the layer. In this case, it will be assumed that the layer metadata indicates that the E: partition includes the path \Docs and that the Report.docx file is stored in the path. As a result, LFFD 201 can modify file open request 210 to create modified file open request 210a of E:\Docs\Report.docx. Modified file open request 210a is then passed to file system 200 which will open Report.docx from the appropriate location on the E: partition. LFFD 201 can perform this type of rerouting for any I/O that pertains to content stored on the E: partition. The determination of whether I/O pertains to content on a particular layer is based on the layer metadata for that particular layer.

FIG. 2B illustrates the case where LFFD 201 determines that a file open request 220 does not pertain to a layer (or at least does not pertain to a layer separate from the layer that includes the operating system). In this example, file open request 220 is directed to File.txt which is stored in a Downloads folder that is assumed to exist on the C: partition. Upon receiving file open request 220, LFFD 201 will evaluate the request against the layer metadata for the E: partition and determine that the E: partition does not include a path of \Downloads. Accordingly, LFFD 201 can allow file open request 220 to pass to file system 200 without modification since the request already includes the correct path to File.txt.

To summarize, LFFD 201 selectively modifies I/O requests so that they are directed to the appropriate layer. In the case of registry access, the LRFD would perform similar functionality to ensure that the registry access is directed to the appropriate layer. It is again reiterated that this rerouting is necessary because the layering system causes the layers to be hidden from the user's perspective while still being visible to the operating system.

BRIEF SUMMARY

The present invention extends to methods, systems, and computer program products for implementing a security solution using a layering system. By using a layering system, any changes that are made to a computing system can be isolated within a separate write layer. Due to this isolation, the changes, which may even be malicious, can be evaluated without fear that the resources in another layer or layers will be negatively affected. In this way, even security threats that are still unknown to antivirus solutions (so-called zero-day attacks) can be prevented from harming the system.

In one embodiment, the present invention is implemented on a computing device on which at least one frozen layer and a write layer are mounted and in which a layering driver causes resources on the at least one frozen layer and the write layer to appear as if the resources were stored in the same storage location. The computing device can be configured to provide a security solution using a layering system that includes a layering driver. When the layering driver receives an I/O request, it can access layer metadata of the at least one frozen layer to identify to which frozen layer the I/O request is directed. The layering driver can also determine that the I/O request pertains to an attempt to create or update a resource on the identified frozen layer. The layering driver can then modify the I/O request to direct the I/O request to the write layer such that the resource is added to the write layer rather than being added to or updated on the identified frozen layer.

In another embodiment, the present invention is implemented as computer storage media storing computer executable instructions which when executed by one or more processors of a computing device perform a method for providing a security solution using a layering system. The method can include: receiving, at a layering driver, an I/O request that is directed to a frozen layer; determining that the I/O request pertains to an attempt to create or update a resource on the frozen layer; and modifying the I/O request to direct the I/O request to a write layer such that the resource is added to the write layer rather than being added to or updated on the frozen layer.

In another embodiment, the present invention is implemented as a computing device for implementing a security solution using a layering system. The computing device can include one or more processors; one or more frozen layers that are mounted on the computing device; a write layer that is mounted on the computing device; and computer storage media storing a layering driver and a layering security system. When the one or more processors execute the layering driver, the layering driver performs the following: receive I/O requests; determine to which of the one or more frozen layers or the write layer each I/O request is directed; and upon determining that an I/O request is directed to a frozen layer and pertains to an attempt to update or add a resource on the frozen layer, modify the I/O request to cause the I/O request to be directed to the write layer. Also, when the one or more processors execute the layering security system, the layering security system evaluates any resource stored on the write layer to determine whether the resource is malicious.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, a layer should be construed as any mountable storage area including a hard disk (whether physical or virtual), a network share, or a folder. In many embodiments, a layer can be in the form of a vdisk/VHD that is streamed from a server to a client where it is mounted for use. In some embodiments, the present invention can be implemented when a client device employs an operating system layer, an application layer, and a user data layer that are each separate from one another. However, in other embodiments, a single layer containing the operating system, applications, and user data may be employed. Accordingly, the present invention should not be limited by the number or type of layers that are employed to store these resources.

Also, in this specification and the claims, the term "layering drivers" will generally refer to one or more file system filter drivers and one or more registry filter drivers which are employed to implement layering as was introduced in the background. These layering drivers, as filter drivers, will be positioned "below" the I/O manager or registry configuration manager (at least in Windows-based implementations) where they can intercept and evaluate I/O requests (or more particular IRPs generated by the I/O manager) or registry requests respectively. The term "layering security system" will generally refer to any components that can provide any type of I/O-based or registry-based security. For example, a layering security system can include one or more filter drivers that evaluate I/O requests to determine whether the I/O requests are indicative of malicious actions. In the following description, examples where the layering drivers are file system filter drivers will be provided. However, the same functionality can be provided by registry filter drivers.

Figure 1:
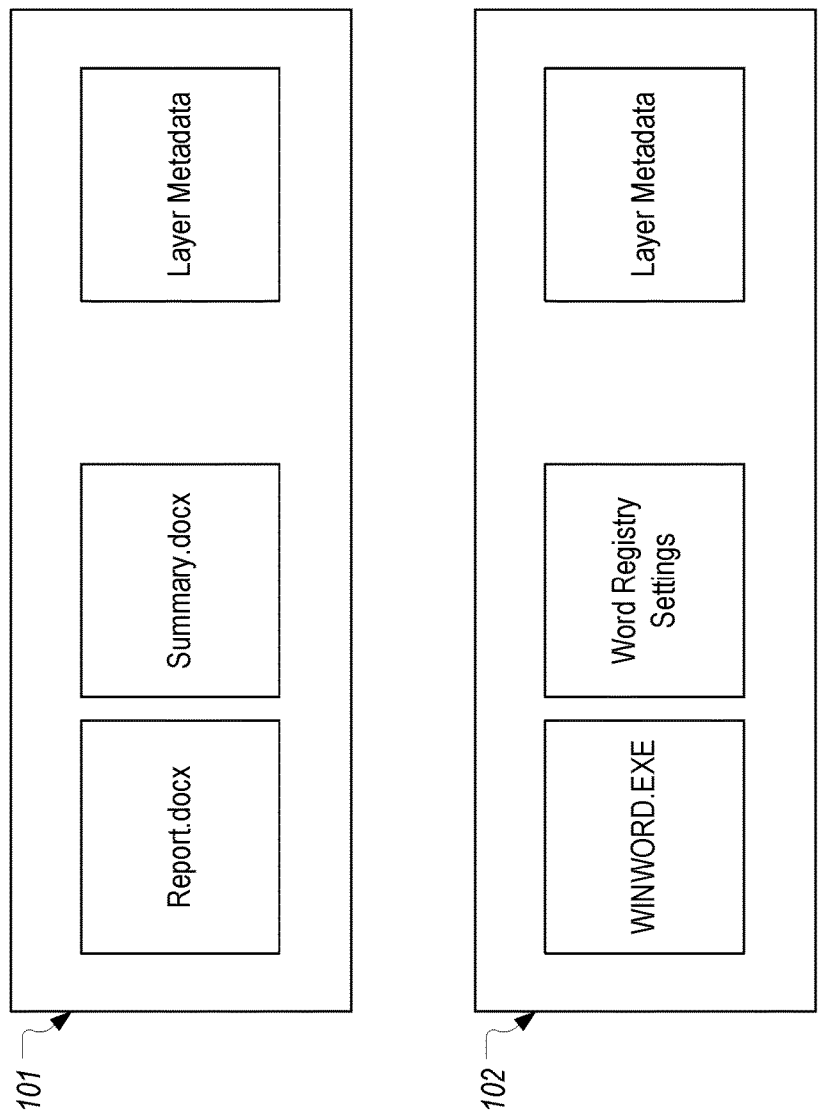
FIG. 1 illustrates simplified examples of layers of a layering system.
Figure 2A:
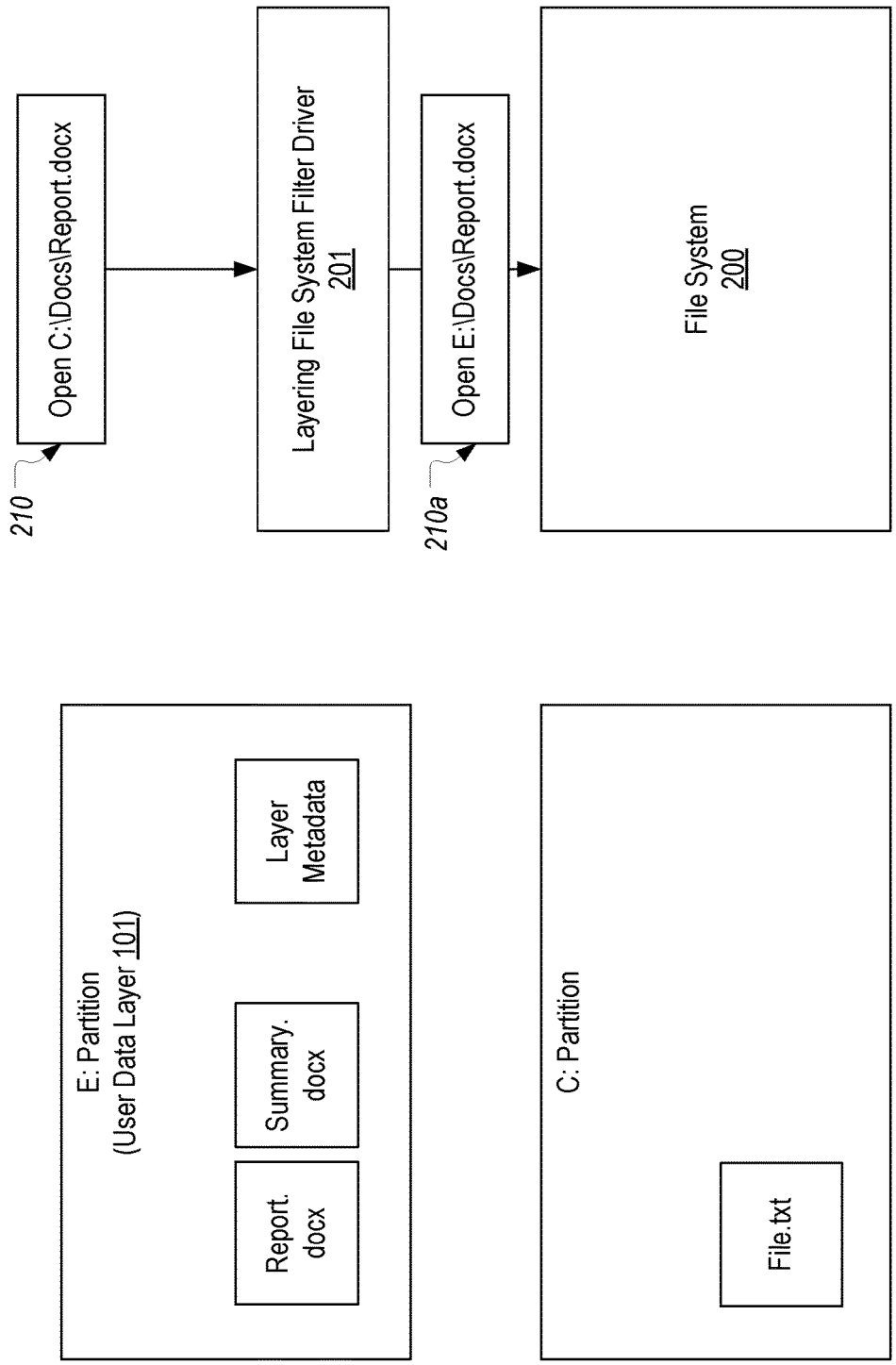
FIGS. 2A and 2B generally illustrate how a layering system can reroute file system or registry operations based on layer metadata of a mounted layer.
Figure 2B:
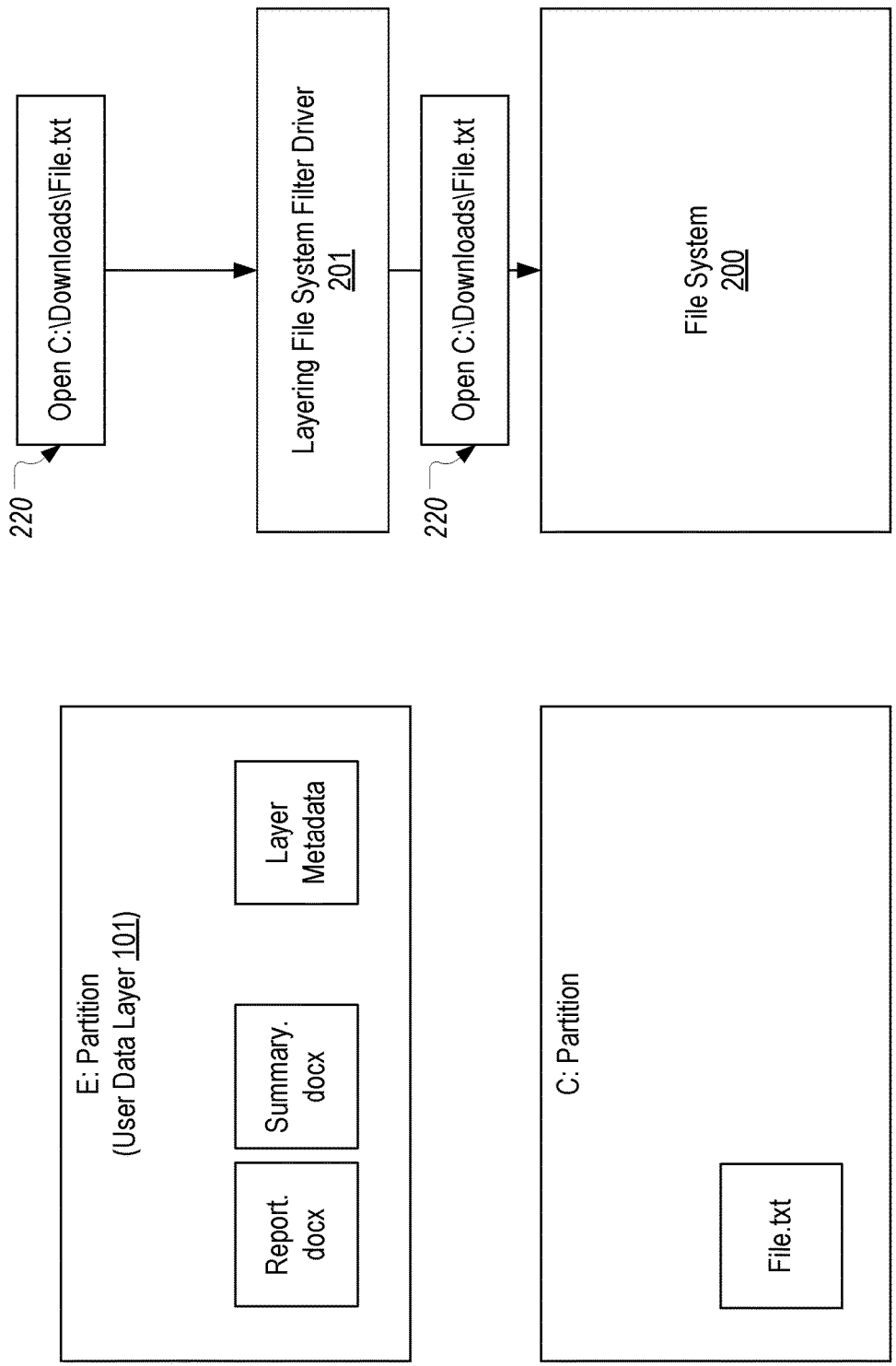
Figure 3:
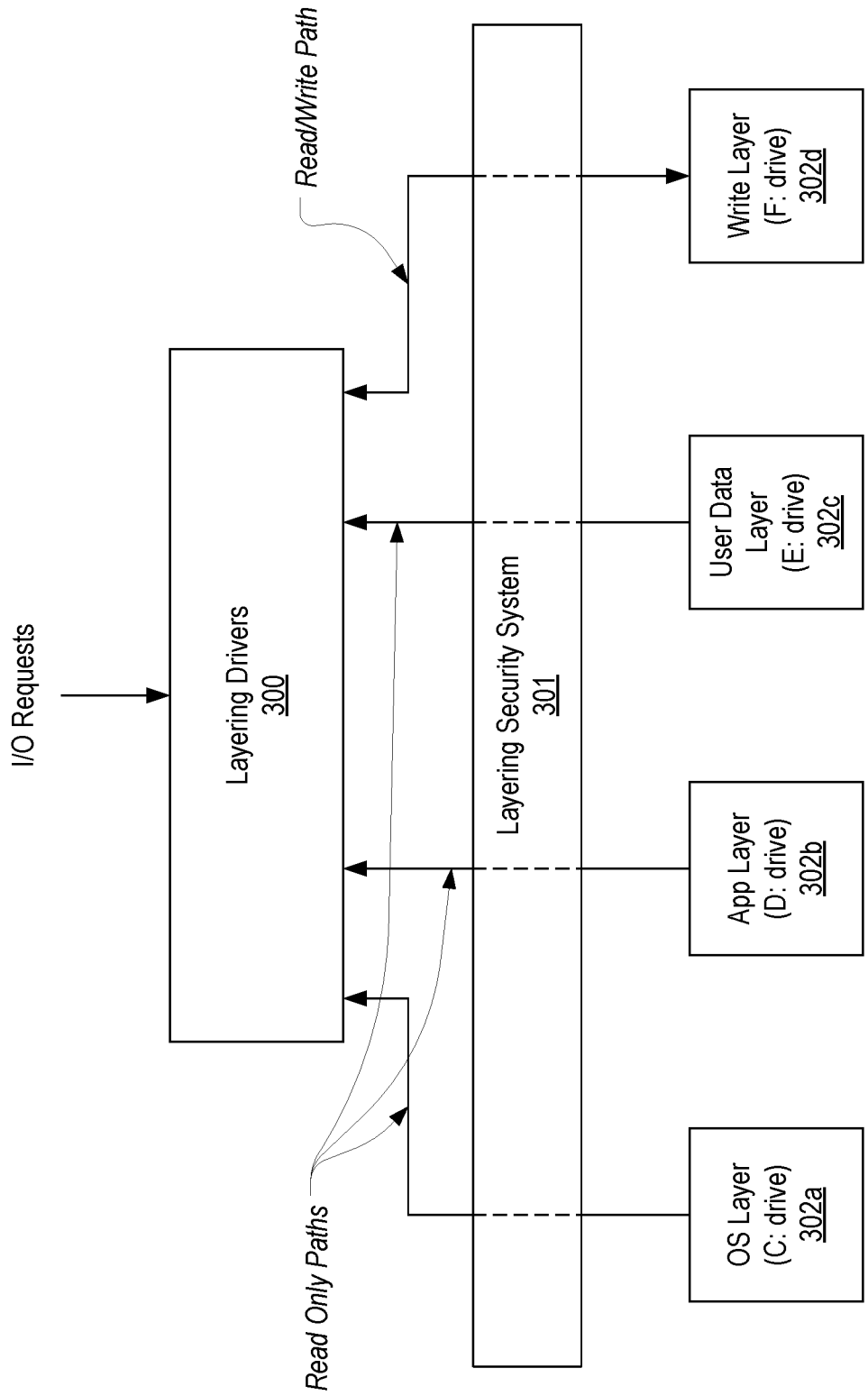
FIG. 3 illustrates the architecture of a layering system that can be employed to provide a security solution.
Figure 3A:
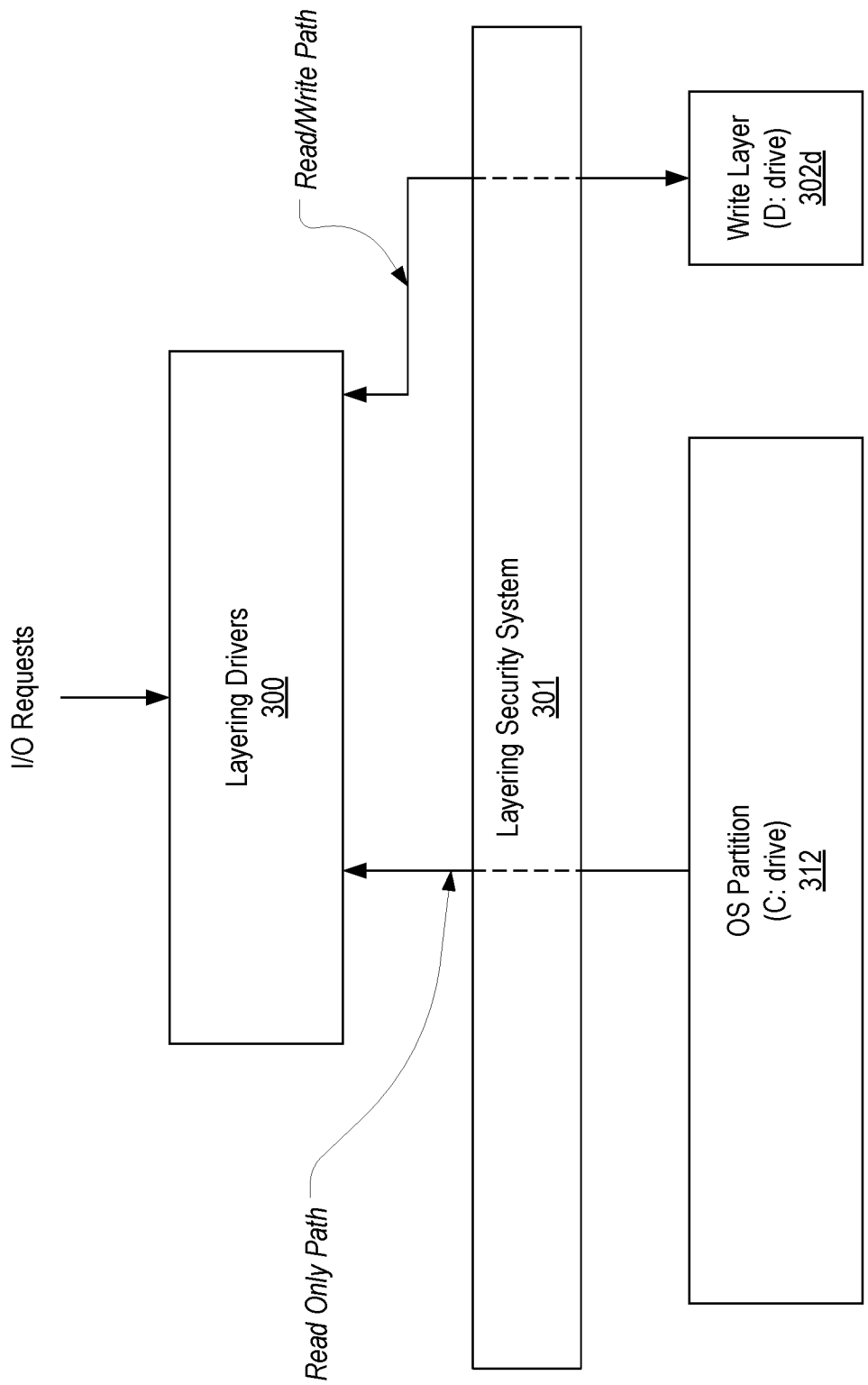
FIG. 3A illustrates an alternate architecture of a layering system that can also be employed to provide a security solution.

FIG. 3 provides an overview of how a computing device can be configured to implement a security solution using a layering system while FIG. 3A illustrates an alternate configuration that could equally be employed. In FIG. 3, it is assumed that an OS layer 302a, an applications layer 302b, a user data layer 302c, and a write layer 302d have all been mounted for use on the computing device. For example, in some embodiments, each (or at least one) of layers 302a-302d could represent a vdisk/VHD that is streamed from a server. However, any of layers 302a-302d could also be in the form of a physical drive, folder, network share, or other mountable structure. For purposes of the following examples, it will be assumed that OS layer 302a has been assigned drive letter C:, application layer 302b has been assigned drive letter D:, user data layer 302c has been assigned drive letter E:, and write layer 302d has been assigned drive letter F:. However, from the user's perspective and due to layering drivers 300, it will appear as if there is a single drive (e.g., a C: drive) on which the resources from each layer are stored. In contrast, FIG. 3A represents a case where the computing system includes a typical operating system partition (or layer) 312 on which applications are installed and user data is stored. Although the configuration shown in FIG. 3A will not be described in detail, it is to be understood that the present invention could be implemented in the same manner described below in this configuration as well as in any other configuration that employs more than a single layer to provide the operating system, applications, and/or user data.

As also shown in FIG. 3, a layering security system 301 may be positioned "below" layering drivers 300 and can be tasked with performing various I/O-based security tasks such as, for example, evaluating any actions taken by a downloaded application to determine whether it is malicious as will be further described below. In some embodiments, layering security system 301 may also implement various types of common antivirus protections for all resources in any layer. In other words, layering security system 301 can provide a full set of malware protections so that it will not be necessary to install a separate antivirus program. In other embodiments, however, a separate antivirus or other security solution can be used in combination with layering security system 301.

As was described in the background, layering drivers 300 can be configured to cause the resources on layers 302a-302d to appear as if they were stored on the same storage medium (e.g., as if they were all stored within the same partition of the computing device's physical hard drive). This is accomplished by redirecting or mapping I/O requests to the appropriate layer based on the target resource of each I/O request. With reference to the configuration shown in FIG. 3A, layering drivers 300 would not need to perform this type of mapping for read requests to content on operating system partition 312 (i.e., this content could be read in a normal manner).

In the following description, the term "frozen layer" will be employed to reference a layer which layering drivers 300 treat as read-only. For example, each of layers 302a-302c and partition 312 can be viewed as a frozen layer since, as will be described below, layering drivers 300 prevent these layers from being updated (at least during the normal I/O process).

In accordance with embodiments of the present invention and regardless of the number of layers used to provide the operating system, applications, and user data, this layering technique can be employed to implement a security solution in which any I/O request that attempts to add a resource to or update a resource on a frozen layer is instead directed to write layer 302d where the added/updated resource will be isolated from the resources on the frozen layer(s). For example, OS layer 302a, application layer 302b, and user data layer 302c can be frozen (i.e., prevented from being modified) by redirecting any I/O request that would otherwise modify these layers to write layer 302d. Similarly, OS partition 312 can be frozen by redirecting any I/O request that would otherwise modify content on OS partition 312 to write layer 302d. Accordingly, FIGS. 3 and 3A each illustrate that a read only path exists for accessing layers 302a-302c and partition 312 respectively while a read/write path exists for write layer 302d. Each of these paths can "pass through" layering security system 301 thereby allowing the layering security system to perform any appropriate evaluation on the I/O requests.

Figure 4:
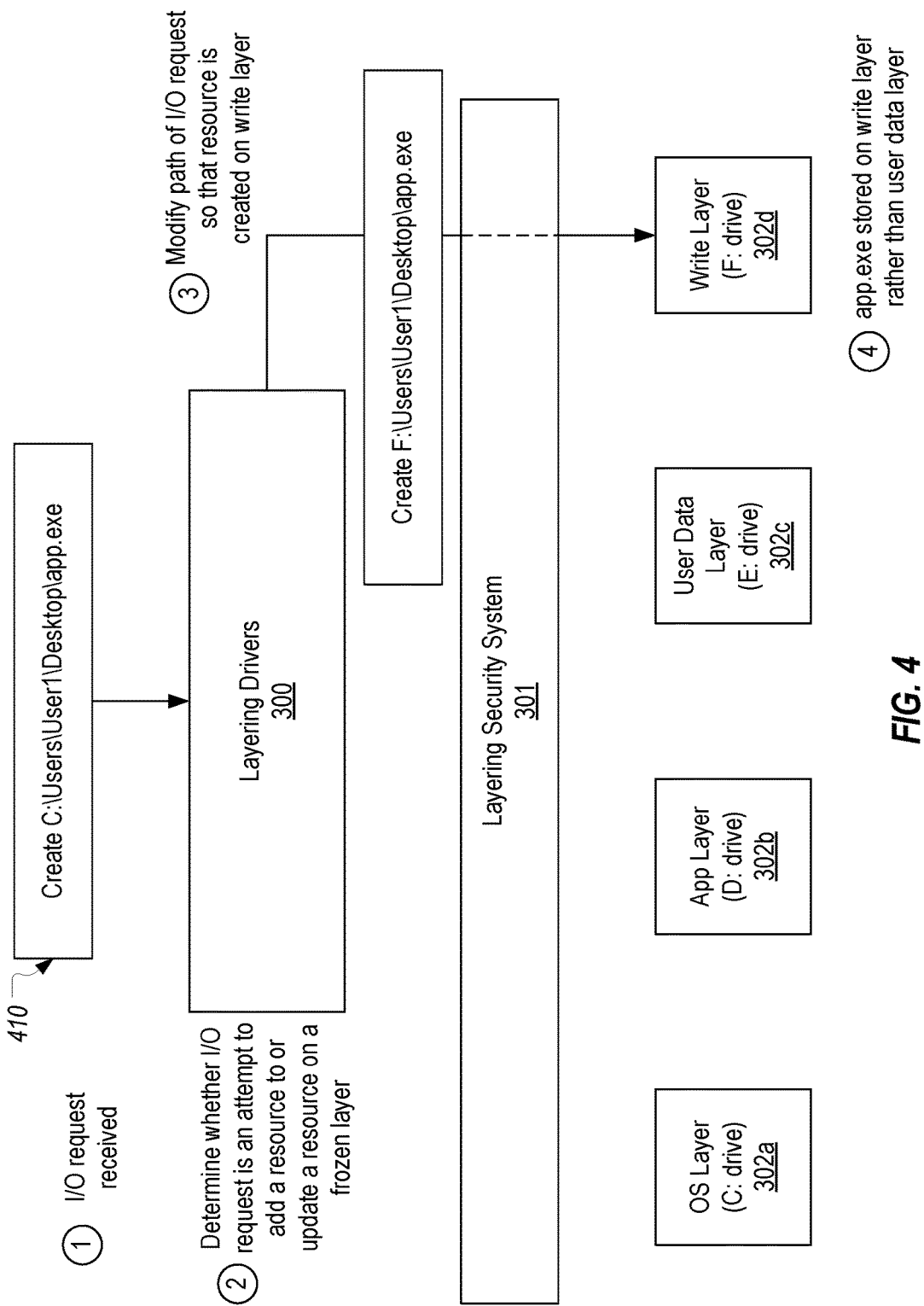
FIGS. 4 and 5 each illustrate an example of how a layering driver can cause an I/O request that is directed to a frozen layer and pertains to an attempt to update or add a resource on the frozen layer can be redirected to a write layer.

FIG. 4, which is based on the configuration depicted in FIG. 3, illustrates how layering drivers 300 can cause any new or updated resource to be stored within write layer 302d so that the changes are isolated from layers 302a-302c. Isolating the changes in this manner can allow layering security system 301 to detect any malware that may be included in the new or updated resource before the malware would have access to the resources on layers 302a-302c. It is noted that this same process could be performed in a system that is configured as shown in FIG. 3A.

In FIG. 4, layering drivers 300 are shown as receiving an I/O request 410 in step 1. I/O request 410, which in practice would typically be in the form of an IRP, is intended to represent a request to create a file "app.exe" on User1's desktop. Accordingly, I/O request 410 is shown as specifying a path of C:\Users\User1\Desktop\app.exe. As an example, I/O request 410 could have been generated in response to User1 electing to download an application to his or her desktop.

As was described in the background, layering drivers 300 can employ metadata on each layer to determine whether the path specified in I/O request 410 needs to be modified to direct the I/O request to the appropriate layer. In this example, it will be assumed that user data layer 302c, which is the E: drive, includes the path "\Users\User1\Desktop." Therefore, layering drivers 300 can determine that the path in I/O request 410 would need to be updated to E:\Users\User1\Desktop\app.exe.

However, in accordance with embodiments of the present invention and as represented by step 2 in FIG. 4, layering drivers 300 can also be configured to determine whether I/O request 410 pertains to an attempt to add a resource to or update a resource on a frozen layer. After determining that I/O request 410 is directed to user data layer 302c, layering drivers 300 can then determine whether I/O request 410 pertains to an attempt to add a resource to or update a resource on user data layer 302c. In this example, because I/O request 410 requests the creation of the file app.exe within the Desktop folder stored on user data layer 302c, layering drivers 300 can prevent I/O request 410 from being directed to user data layer 302c (since user data layer 302c is a frozen layer). Instead, layering drivers 300 can modify I/O request 410 so that the app.exe file will be created on write layer 302d.

As shown in step 3, layering drivers 300 can modify the path in I/O request 410 to point to write layer 302d. In this example, the modification can include changing E: to F: so that I/O request 410 will be directed towards write layer 302d rather than user data layer 302c. As a result, and as represented by step 4, app.exe will be stored on write layer 302d rather than user data layer 302c. Although not shown, as part of modifying the path of I/O request 410, layering drivers 300 can also cause metadata of write layer 302d to be updated to reflect the addition of app.exe on write layer 302d at the \Users\User1\Desktop\ path to thereby facilitate the subsequent retrieval of app.exe from write layer 302d. It is noted that a similar process would be performed whenever any new resource is created such as when a file is downloaded from the internet, an email is received, or the user creates a new file using an existing application.

Figure 5:
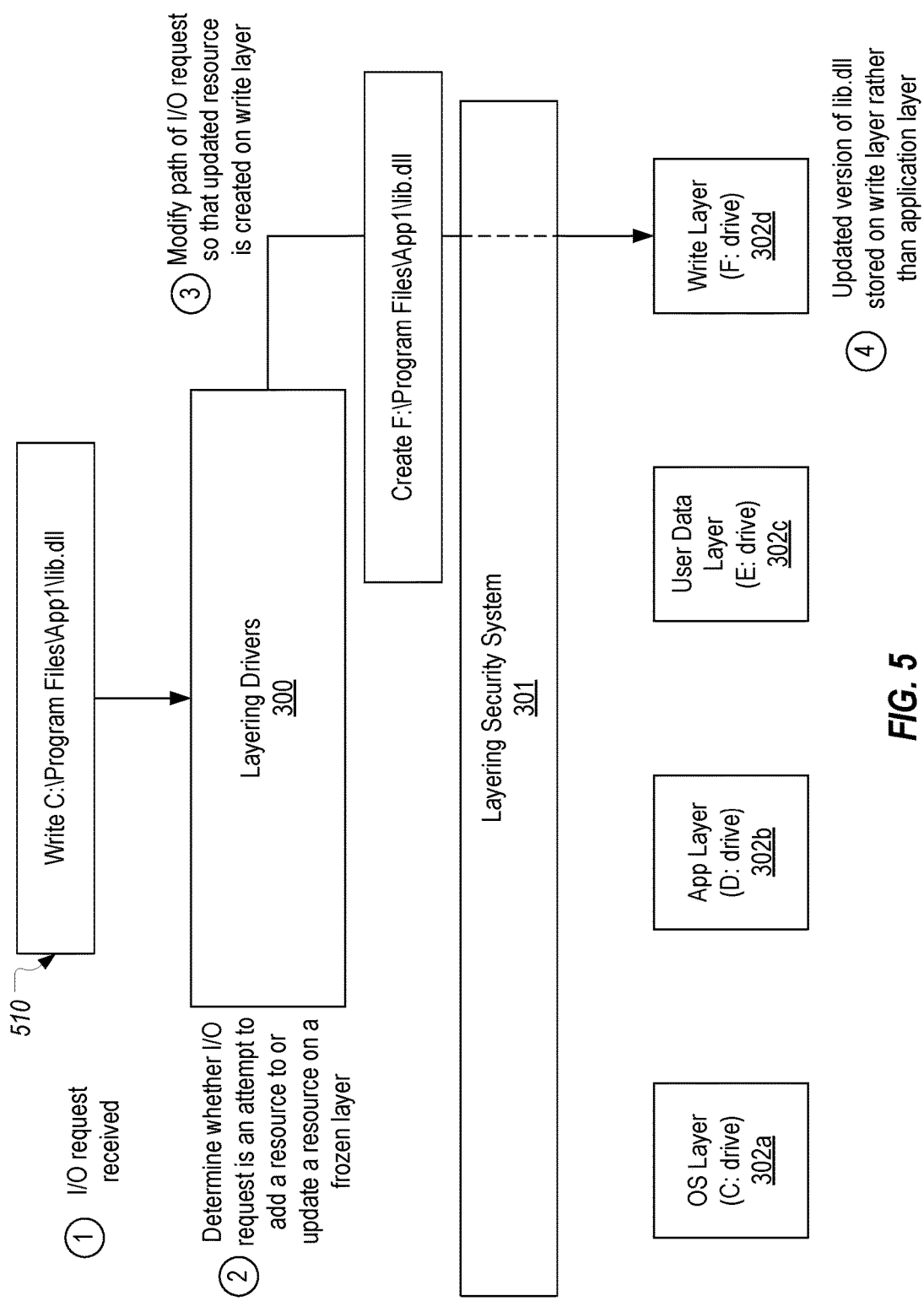

FIG. 5 provides an example similar to that of FIG. 4 except that I/O request 510 is an attempt to update a resource stored on application layer 302b. As shown in step 1, layering drivers 300 receive I/O request 510. I/O request 510 is a write request to the lib.dll resource that, from the user's perspective and from the perspective of the upper level I/O components, is stored at C:\Program Files\App1\. By employing the metadata of each layer, layering drivers 300 can determine that the Program Files folder is actually stored on application layer 302b. Therefore, layering drivers 300 can determine that the path in I/O request 510 should be updated to point to the D: drive rather than the C: drive.

However, in step 2, layering drivers 300 can determine that I/O request 510 is an attempt to update a resource on a frozen layer (i.e., an attempt to update the file lib.dll which is stored on application layer 302b). Therefore, rather than modifying I/O request 510 to point to application layer 302b, layering drivers 300 can modify I/O request 510 to point to write layer 302d as shown in step 3. Additionally, because the file lib.dll does not exist on write layer 302d, it will be necessary to change the request from a write request to a create request so that the updated file lib.dll will be created on write layer 302d. Layering drivers 300 can also update write layer 302d's metadata to reflect the presence of lib.dll at the \Program Files\App1\ path. Because application layer 302b will also include metadata identifying the presence of the lib.dll resource, layering drivers 300 may also be configured to delete this metadata from application layer 302b or otherwise provide an indication in the metadata of either or both of write layer 302d and application layer 302b to define from which layer lib.dll should be accessed.

If the updates to lib.dll happen to be malicious, the malicious code will be isolated within write layer 302d where it will likely only be able to cause minimal, if any, harm to the computing system. Additionally, while lib.dll is isolated within write layer 302d, layering security system 301 can perform various actions to identify the presence of any malicious code and to take appropriate action to remove the malicious code and/or resource.

Accordingly, the user is able to freely add or update resources in a typical manner. However, due to layering drivers 300, these added or updated resources will be isolated within write layer 302d where they will not be able to harm the resources on frozen layers if they happen to be malicious. Further, due to layering drivers 300, the fact that these resources are isolated on write layer 302d will not be apparent to the user. From the user's perspective, the resources on write layer 302d will appear as if they were stored on the same partition/volume as the resources on the other layers. Therefore, the user can access (e.g., read/write) the resources that are stored in write layer 302d in a substantially normal manner (from the user's perspective).

In some embodiments, a snapshot of a write layer may be periodically taken. This snapshot could then be treated in a similar manner as any other frozen layer. In particular, when it is desired to create a snapshot, a new write layer can be created and all modifying I/O requests could then be redirected to the new write layer. The now old write layer could be frozen (i.e., treated as read-only) in the same manner as any other frozen layer.

Figure 6A:
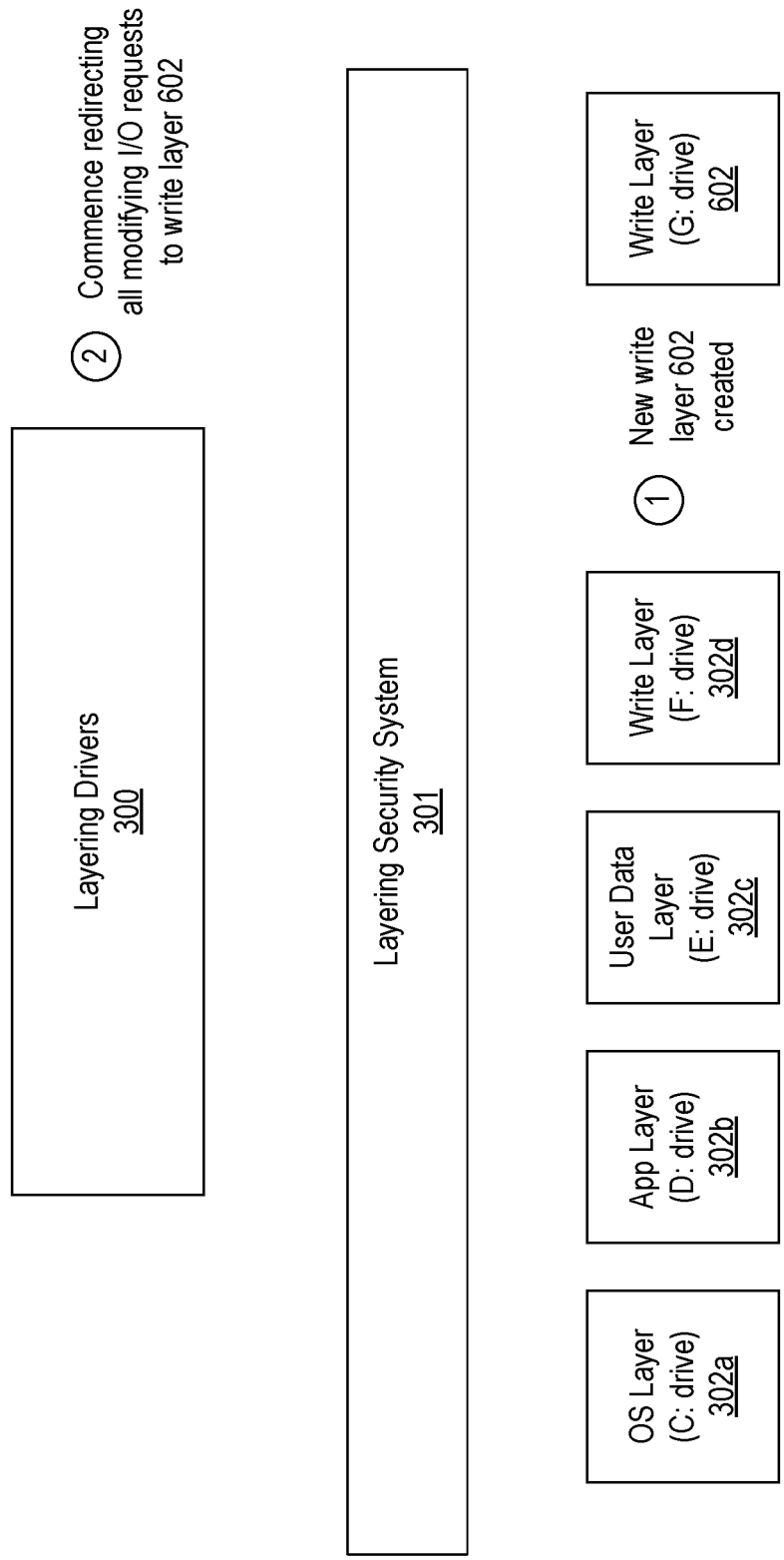
FIGS. 6A and 6B illustrate an example of how a write layer can become a frozen layer.
Figure 6B:
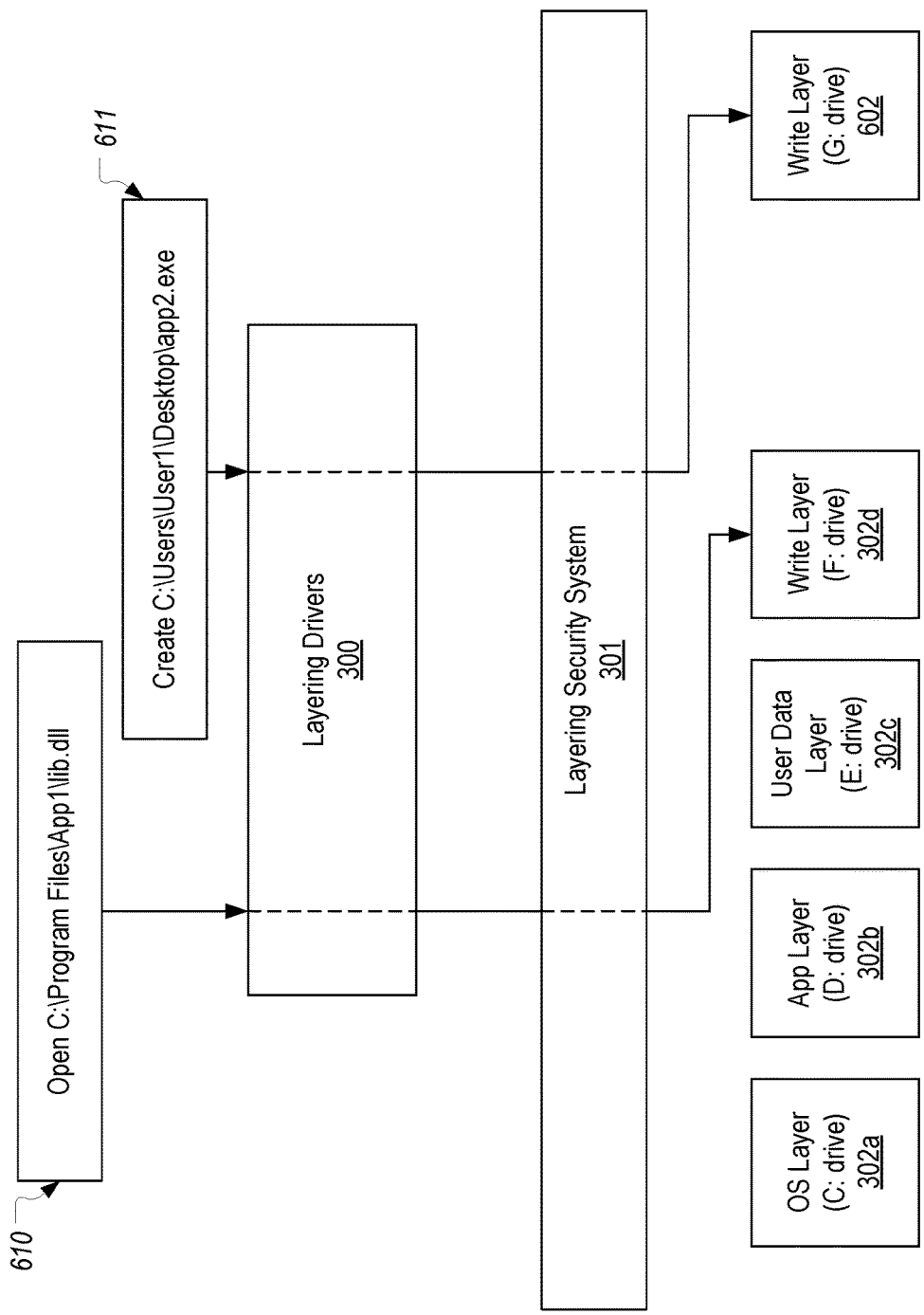

FIGS. 6A and 6B provide an example of how write layer 302d can become a frozen layer. As represented in step 1 in FIG. 6A, a new write layer 602 can be created. The creation of a new write layer could be performed for various reasons including manually (e.g., in response to user input) or automatically (e.g., at periodic intervals or in response to receiving a particular type of I/O request such as a request to create an executable that is being downloaded from an unknown source). Regardless of the reason for creating a new write layer, once new write layer 602 has been created, layering drivers 300 can commence redirecting any modifying I/O request to write layer 602 which in effect will cause write layer 302d to become a frozen layer. In other words, once write layer 602 is created, layering drivers 300 will only direct non-modifying I/O requests to write layer 302d.

FIG. 6B provides an example of how layering drivers 300 can handle I/O requests once write layer 602 is created. As shown, an I/O request 610 which requests to open the lib.dll is received. As was illustrated in FIG. 5, lib.dll was stored on write layer 302d in response to I/O request 510 which will be evidenced by the metadata on write layer 302d. Layering drivers 300 will therefore determine that I/O request 610 should be modified by replacing C: with F:. Also, because I/O request 610 is a read request, layering drivers 300 will allow the I/O request to be directed to the now frozen write layer 302d. In contrast, when layering drivers 300 receive I/O request 611, which is a request to create a new .exe on the user's desktop, layering drivers 300 will redirect the request to write layer 602.

One benefit of creating snapshots in this manner is that it would allow the computing system to be easily rolled back to a previous state. For example, if layering security system 301 determines that app2.exe is malicious, it could instruct layering drivers 300 to discard write layer 602 and revert to (or "unfreeze") write layer 302d. This would have the effect of reverting the computing system to the state that existed immediately prior to creating write layer 602.

When the layering system is configured to create snapshots, a relatively large number of frozen layers may be created over time. Since a large number of layers may adversely impact the performance of the layering system, in some embodiments of the present invention, layering drivers 300 may be configured to merge multiple frozen layers into a single frozen layer thereby reducing the total number of layers. This can be accomplished by copying the resources and metadata from one frozen layer into another frozen layer and then discarding the layer from which the content was copied. Typically, only frozen write layers would be merged together and only after it had been determined that the contents of each frozen write layer are safe and that the ability to roll back to the state represented by the copied layer was not desired. However, it would also be possible to merge a frozen write layer with an operating system layer, an application layer, or a user data layer.

Figure 7A:
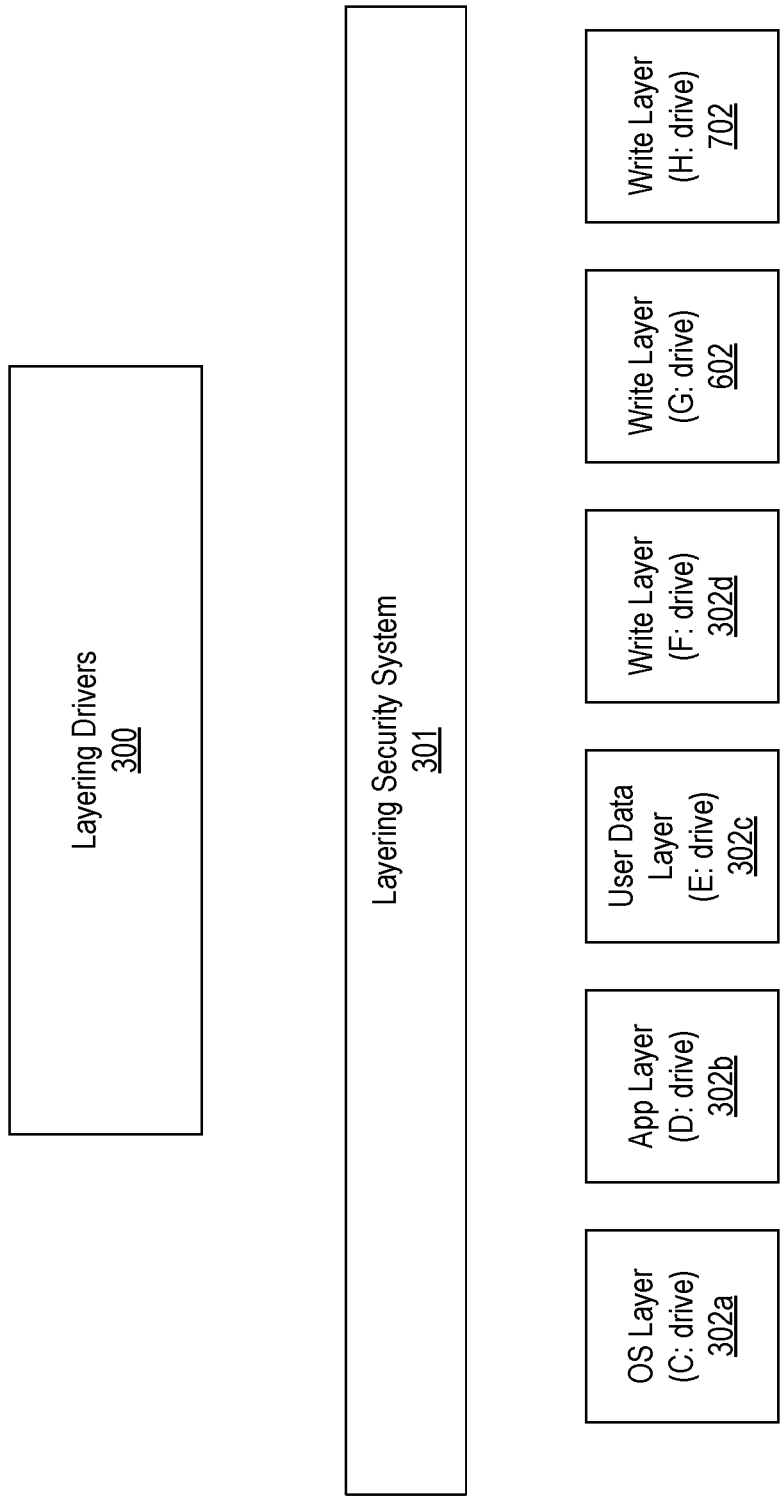
FIGS. 7A and 7B illustrate an example of how multiple frozen write layers can be merged.
Figure 7B:
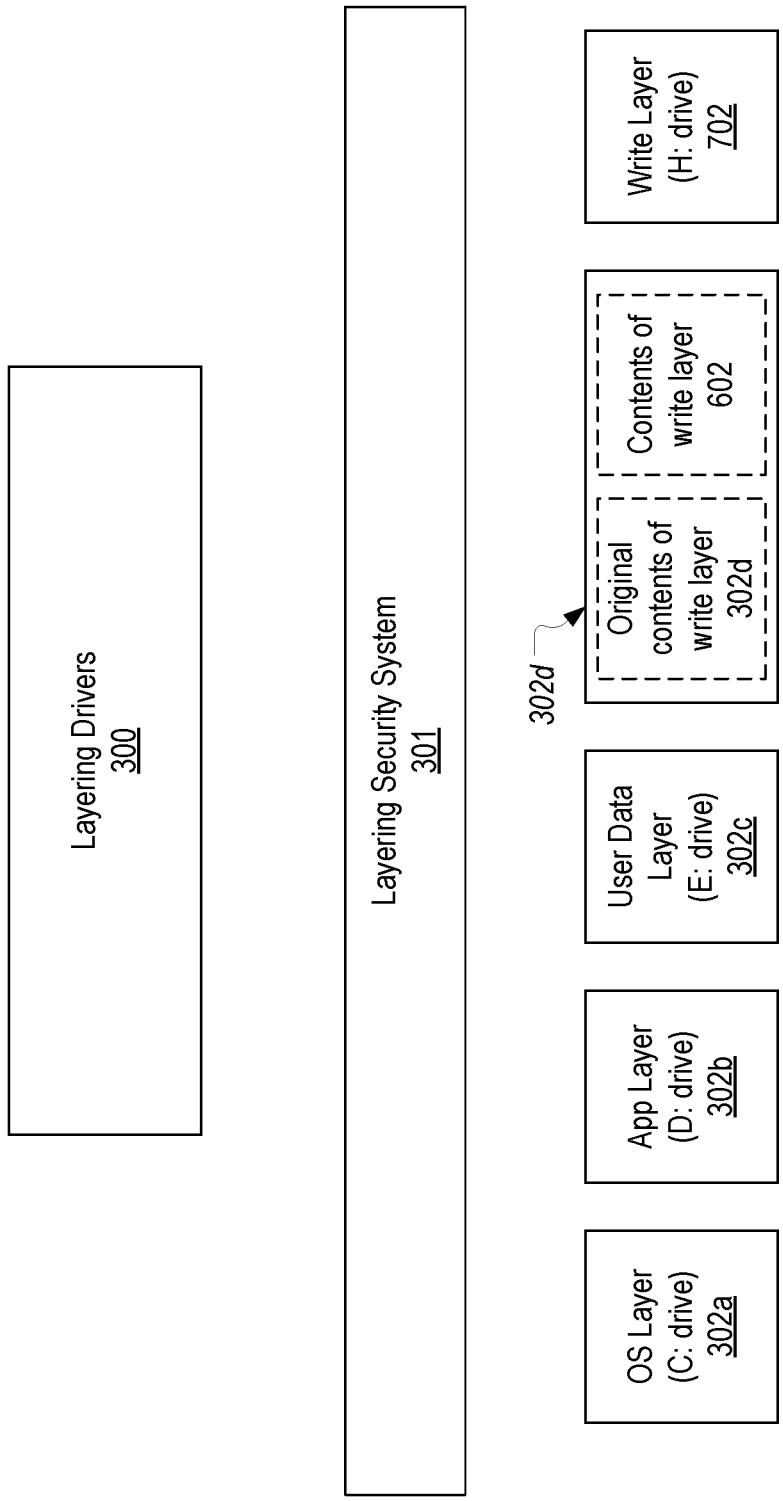

FIGS. 7A and 7B illustrate an example of how two frozen write layers can be merged. In FIG. 7A, it is assumed that a new write layer 702 has been created and that all modifying I/O requests are now being redirected to write layer 702. Therefore, write layer 602 has become a frozen layer. Layering drivers 300 may therefore determine that it would be desirable to merge the contents of write layer 602 into write layer 302d to reduce the total number of frozen layers from five to four. Therefore, as represented in FIG. 7B, the contents (e.g., resources and metadata) of write layer 602 can be copied to write layer 302d such that write layer 302d will include its original contents as well as the copied contents. After this copying of the contents of write layer 602 is completed, write layer 602 can be discarded (e.g., unmounted). Because the metadata of write layer 602 will have been copied to write layer 302d, layering drivers 300 can employ the metadata to ensure that I/O requests to read content that was stored on write layer 602 are appropriately routed to write layer 302d.

Although it may not be typical to do so, in some embodiments of the present invention, a frozen write layer may also be merged with an operating system layer, an application layer, and/or a user data layer. The process of merging a frozen write layer with any of these other types of layers may be performed in a slightly different manner than when combining frozen write layers as is shown in FIGS. 8A and 8B.

Figure 8A:
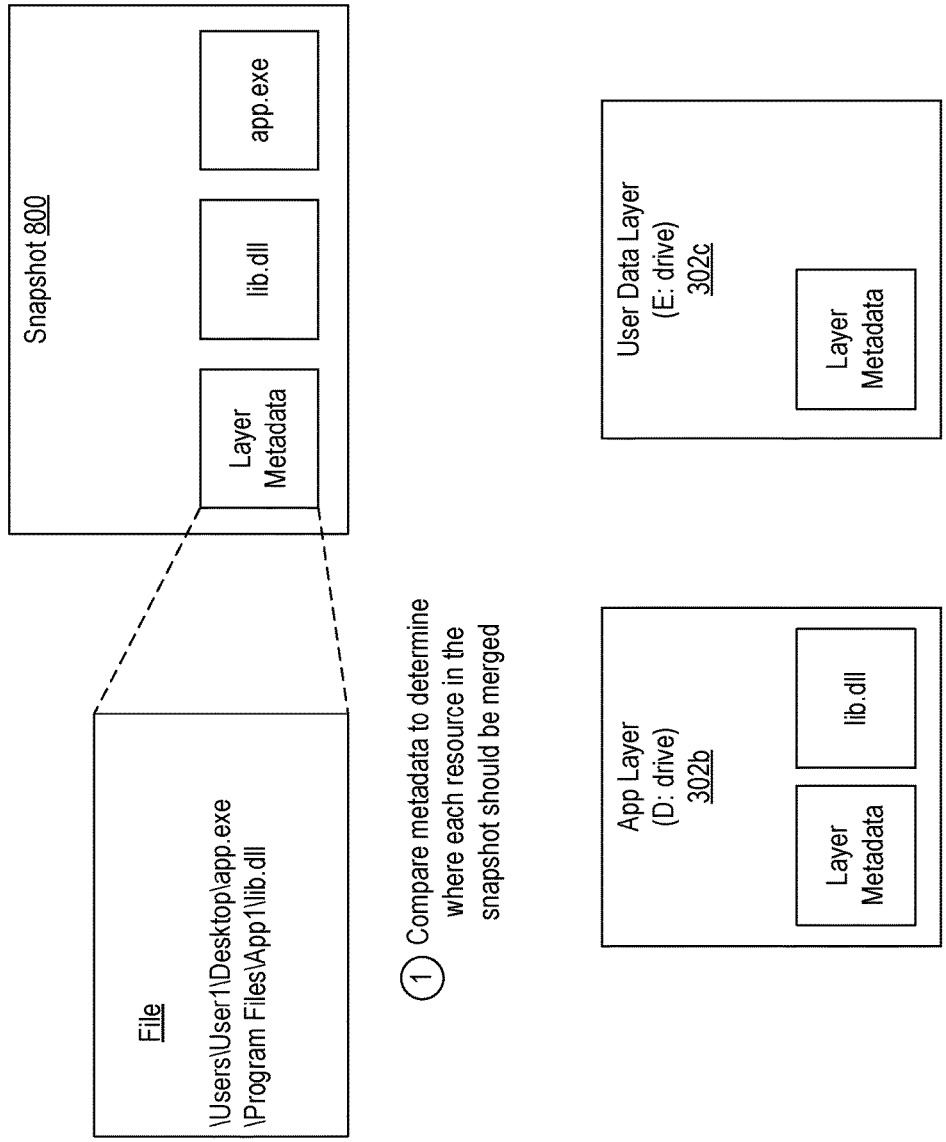
FIGS. 8A and 8B illustrate an example of how a frozen write layer can be merged with one or more of an operating system layer, an application layer, or a user data layer.

In FIG. 8A, it is assumed that a snapshot 800 of write layer 302d was taken while write layer 302d stored app.exe and lib.dll. Snapshot 800 also includes the layer metadata. In this case, this layer metadata will identify app.exe and lib.dll as well as the path to the location where they are stored. Although not shown, the layer metadata in each frozen layer (e.g., application layer 302b and user data layer 302c) will also identify which files are stored in the layer as well as their paths. For example, the layer metadata for application layer 302b could include an entry of \Program Files\App1\lib.dll which represents that the old version of lib.dll (i.e., the one that was updated in the example of FIG. 5) is stored on application layer 302b. It will be assumed that the layer metadata for user data layer 302c will indicate that the path \Users\User1\Desktop\ exists on user data layer 302c; however, it will not identify a file named app.exe in this path since that file never would have been created on user data layer 302c.

As indicated in step 1 of FIG. 8A, the layer metadata in snapshot 800 can be compared to the layer metadata of each of the frozen layers to determine where each resource in snapshot 800 should be merged. For example, it can be determined that application layer 302b includes a path \Program Files\App1\, and therefore, any resource in snapshot 800 with that same path should be merged to application layer 302b. Similarly, it can be determined that user data layer 302c includes a path \Users\User1\Desktop\, and therefore, any resource in snapshot 800 with that same path should be merged to user data layer 302c.

Figure 8B:
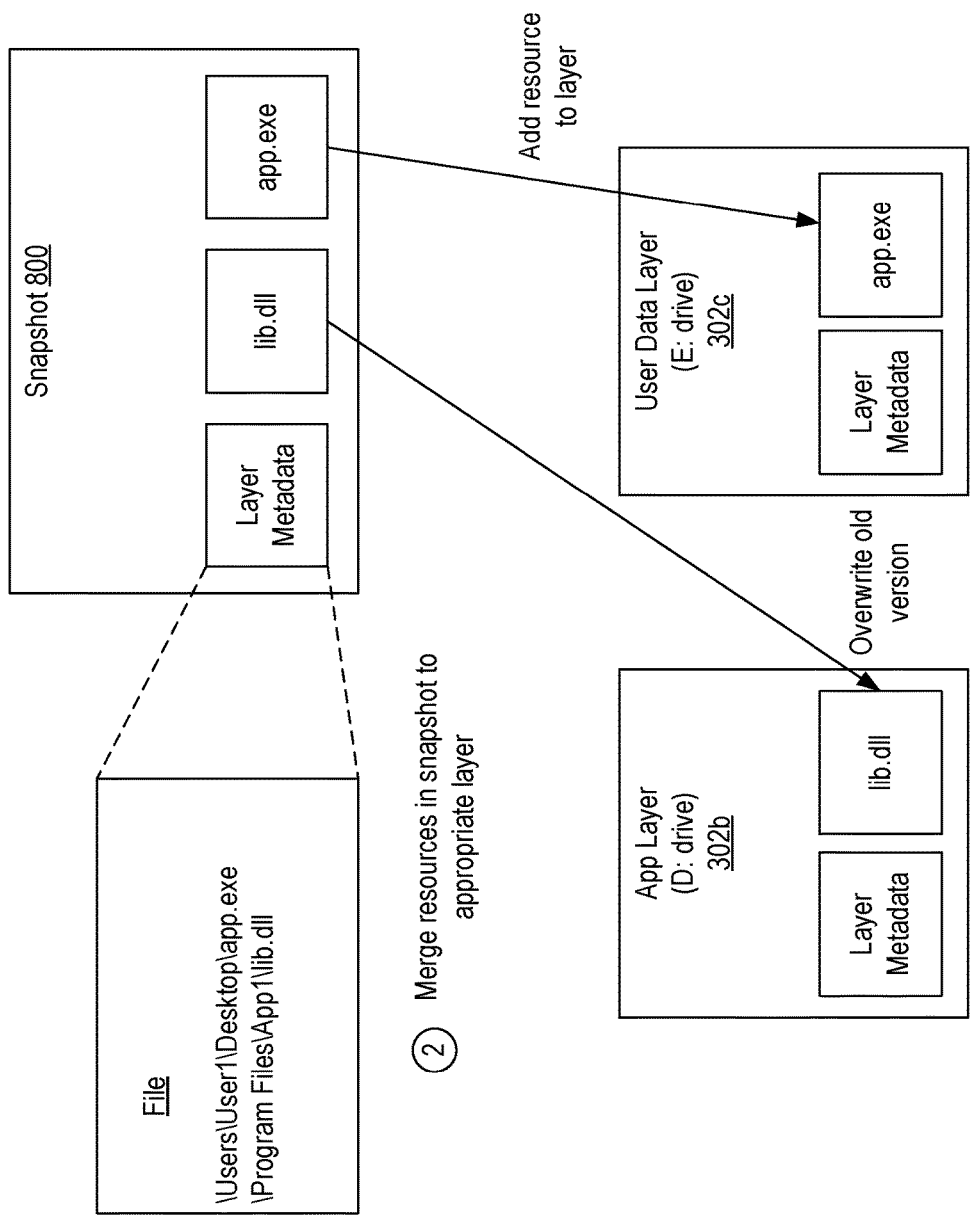

FIG. 8B represents how the different resources in snapshot 800 can be merged in step 2. With regards to merging lib.dll, in addition to determining that the resource should be merged with application layer 302b, it can also be determined that a version of lib.dll already exists on application layer 302b. Therefore, the updated version of lib.dll in snapshot 600 can overwrite the old version of lib.dll that resides on application layer 302b. In such cases, it may not be necessary to update application layer 302b's metadata since the metadata will already reflect the presence of lib.dll. In contrast, the evaluation of user data layer 302c's metadata will reveal that there is no resource named app.exe in the \Users\User1\Desktop\ path. Therefore, app.exe can be written to user data layer 302c and user data layer 302c's metadata can be updated to reflect the presence of app.exe.

Due to layering drivers 300, these resources will be accessed in the same way (from the user perspective) whether they are stored in write layer 302d or in the other layers. Layering drivers 300 therefore hide the underlying security solution functionality.

Figure 9:
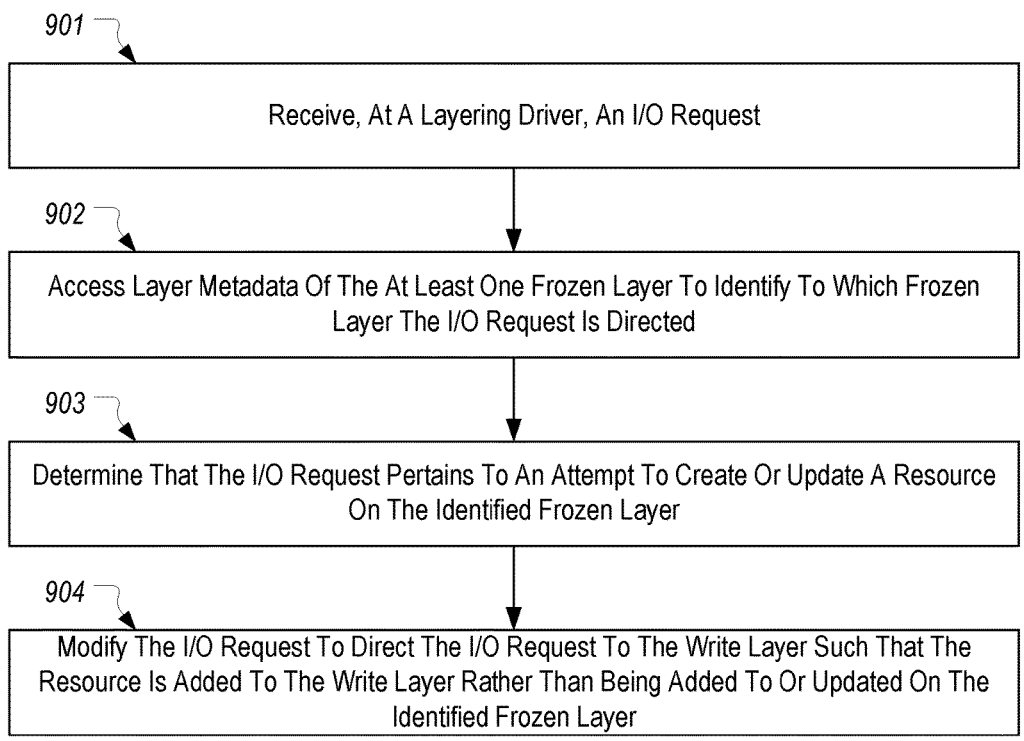
FIG. 9 illustrates a flowchart of an example method for providing a security solution using a layering system.

FIG. 9 illustrates a flowchart of an example method 900 for providing a security solution using a layering system. Method 900 can be implemented on a computing device on which at least one frozen layer and a write layer are mounted and in which a layering driver causes resources on the at least one frozen layer and the write layer to appear as if the resources were stored in the same storage location. For example, a computing device that includes layering drivers 300 and on which layers 302a-302d are mounted (or on which partition 312 is mounted) could perform method 900.

Method 900 includes an act 901 of receiving, at a layering driver, an I/O request. For example, layering drivers 300 can receive I/O request 410 or 510.

Method 900 includes an act 902 of accessing layer metadata of the at least one frozen layer to identify to which frozen layer the I/O request is directed. For example, layering driver 300 can access layer metadata of any of layers 302a-302c.

Method 900 includes an act 903 of determining that the I/O request pertains to an attempt to create or update a resource on the identified frozen layer. For example, layering drivers 300 can determine that I/O request 410 attempts to create app.exe on user data layer 302c or that I/O request 510 attempts to update lib.dll on application layer 302b.

Method 900 includes an act 904 of modifying the I/O request to direct the I/O request to the write layer such that the resource is added to the write layer rather than being added to or updated on the identified frozen layer. For example, I/O request 410 or I/O request 510 could be modified so that they are directed to the F: drive.

In summary, the present invention allows layers that are known to be safe to be treated as frozen (or read-only) layers. Any I/O that attempts to modify these layers can be redirected to a write layer where the new and/or updated resources will be isolated from the frozen layers. The resources on the write layer can then be evaluated to determine whether they are safe. If they are safe, the resources can be merged onto the appropriate frozen layers. In this way, threats that may not be detectable by common antivirus programs (e.g., zero-day attacks) can be isolated from the other resources.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented on a computing device on which at least one frozen layer and a write layer are mounted and in which a layering driver causes resources on the at least one frozen layer and the write layer to appear as if the resources were stored in a same storage location, for providing a security solution using a layering system, the method comprising:
   receiving, at the layering driver, an input/output ("I/O") request;
   accessing layer metadata of the at least one frozen layer to identify to which frozen layer the I/O request is directed, each frozen layer and the write layer comprising a separately mounted storage area;
   determining that the I/O request pertains to an attempt to create or update a resource on the identified frozen layer;
   modifying the I/O request to direct the I/O request to the write layer such that the resource is added to the write layer, which is a separately mounted storage area from each frozen layer, rather than being added to or updated on the identified frozen layer; and
   while the resource is stored on the write layer, evaluating the resource to determine whether the resource is malicious.

2. The method of claim 1, further comprising:
   after determining that the resource is not malicious, converting the write layer into a frozen layer;
   creating a new write layer; and
   modifying subsequent I/O requests that attempt to create or update a resource on any frozen layer to direct the subsequent I/O requests to the new write layer.

3. The method of claim 1, further comprising:
   after one or more resources have been stored on the new write layer, converting the new write layer into a frozen layer; and
   merging the frozen layer that was converted front the new write layer with the frozen layer that was converted from the write layer such that resources that were stored on the write layer and the new write layer are stored on a single frozen layer.

4. The method of claim 1, wherein the write layer is created in response to determining that the I/O request pertains to an attempt to create a resource on the identified frozen layer thereby causing the resource to be stored in isolation on the separately mounted storage area.

5. The method of claim 1, wherein modifying the I/O request comprises changing a drive letter of the I/O request to match a drive letter assigned to the write layer.

6. The method of claim 1, wherein modifying the I/O request includes adding layer metadata to the write layer to reflect the presence of the resource on the write layer.

7. The method of claim 1, wherein the I/O request is a request to update a resource that is stored on the identified frozen layer such that the updated resource is stored on the write layer.

8. The method of claim 7, further comprising:
modifying layer metadata of one or both of the write layer or the identified frozen layer to cause the layering driver to access the updated resource on the write layer rather than the resource on the identified frozen layer.

9. The method of claim 1, further comprising:
converting the write layer into a first frozen write layer; and
creating a second write layer that is a separately mounted storage area from the first frozen write layer and from each of the at least one frozen layers.

10. The method of claim 9, further comprising:
converting the second write layer into a second frozen write layer; and
merging the first and second frozen write layers.

11. The method of claim 10, wherein merging the first and second frozen write layers comprises combining resources and metadata from the first and second frozen write layers into a same frozen write layer, the same frozen write layer comprising a separately mounted storage area from each of the at least one frozen layers.

12. The method of claim 1,
wherein evaluating the resource to determine whether the resource is malicious comprises evaluating the resource while the resource is executed.

13. The method of claim 1, further comprising:
receiving, at the layering driver, a second I/O request;
accessing layer metadata of the write layer to determine that the I/O request is directed to the resource stored on the write layer; and
passing the I/O request to the write layer to allow the resource to be accessed.

14. One or more computer storage media storing computer executable instructions which when executed by one or more processors of a computing device perform a method for providing a security solution using a layering system that includes at least one frozen layer, a write layer and a layering driver that causes resources on the at least one frozen layer and the write layer to appear as if the resources were stored in a same storage location, the method comprising:
receiving, at the layering driver, an input/output ("I/O") request;
accessing layer metadata of the at least one frozen layer to identify to which frozen layer the I/O request is directed, each frozen layer and the write layer comprising a separately mounted storage area;
determining that the I/O request pertains to an attempt to create or update a resource on the identified frozen layer;
modifying the I/O request to direct the I/O request to the write layer such that the resource is added to the write layer, which is a separately mounted storage area from each frozen layer, rather than being added to or updated on the identified frozen layer;
while the resource is stored on the write layer, evaluating the resource to determine whether the resource is malicious;
upon determining that the resource is malicious, discarding the write layer.

15. The computer storage media of claim 14, wherein the method further comprises:
converting one of the at least one frozen layers into a second write layer.

16. The computer storage media of claim 15, wherein the method further comprises:
receiving at the layering driver, a second I/O request;
accessing the layer metadata to identify to which frozen layer the second I/O request is directed;
determining that the second I/O request pertains to an attempt to create or update a second resource on the identified frozen layer;
modifying the second I/O request to direct the second I/O request to the second write layer such that the second resource is added to the second write layer.

17. The computer storage media of claim 15, wherein the method further comprises:
converting the second write layer into a frozen write layer; and
redirecting any I/O requests that would modify or create a resource on the frozen write layer to a third write layer, the third write layer comprising a separate mounted storage area.

18. A computing device for implementing a security solution using a layering system, comprising:
one or more processors;
one or more frozen layers, each of which is a separately mounted storage area on the computing device;
a write layer that is a separately mounted storage area on the computing device from each of the one or more frozen layers; and
computer storage media storing a layering driver and a layering security system, wherein, when the one or more processors execute the layering driver, the layering driver performs the following:
receive I/O requests;
determine to which of the one or more frozen layers or the write layer each I/O request is directed; and
determine that an I/O request is directed to a frozen layer by evaluating layer metadata of the frozen layer;
upon determining that the I/O request is directed to the frozen layer and pertains to an attempt to update or add a resource on the frozen layer, modify the I/O request to cause the I/O request to be directed to the write layer; and
wherein, when the one or more processors execute the layering security system, the layering security system evaluates one or more resources stored on the write layer to determine whether any of the one or more resources stored on the write layer is malicious; and
wherein the layering driver converts the write layer into a frozen layer and creates a new write layer when the layering security system determines that no resources stored on the write layer are malicious.

19. The computing device of claim 18, wherein modifying the I/O request to cause the I/O request to be directed to the write layer comprises updating layer metadata of the write layer to reflect that the resource is stored on the write layer.

20. The computing device of claim 18, wherein the layering driver is also configured to merge two frozen layers by combining resources stored on the two frozen layers onto a single frozen layer.

* * * * *